(12) United States Patent
Lehnert et al.

(10) Patent No.: US 9,689,530 B2
(45) Date of Patent: Jun. 27, 2017

(54) METHOD OF DOSING LUBRICANT GREASE WITH A LUBRICANT DISPENSER

(71) Applicant: PERMA-TEC GmbH & CO. KG, Euerdorf (DE)

(72) Inventors: Jochen Lehnert, Niederlauer (DE); Manfred Grom, Schlimpfhof (DE); Thomas Haupt, Burkardroth (DE); Egon Eisenbacher, Karlstadt (DE)

(73) Assignee: perma-tec GmbH & Co. KG, Euerdorf (DE)

( * ) Notice: Subject to any disclaimer, the term of this patent is extended or adjusted under 35 U.S.C. 154(b) by 114 days.

(21) Appl. No.: 14/443,076

(22) PCT Filed: Oct. 28, 2013

(86) PCT No.: PCT/EP2013/072523
§ 371 (c)(1),
(2) Date: May 15, 2015

(87) PCT Pub. No.: WO2014/079658
PCT Pub. Date: May 30, 2014

(65) Prior Publication Data
US 2016/0327208 A1    Nov. 10, 2016

(30) Foreign Application Priority Data

Nov. 23, 2012 (DE) .......................... 10 2012 111 376

(51) Int. Cl.
*F16N 7/14* (2006.01)
*F16N 7/36* (2006.01)
(Continued)

(52) U.S. Cl.
CPC .............. *F16N 29/02* (2013.01); *F16N 11/08* (2013.01); *H02P 7/00* (2013.01); *H02P 7/29* (2013.01);
(Continued)

(58) Field of Classification Search
CPC ...... F16N 11/10; F16N 11/08; F16N 2230/02; F16N 2250/08; H02P 23/14
(Continued)

(56) References Cited

U.S. PATENT DOCUMENTS 1,699,106 A * 1/1929 Given ..................... H02P 5/485
                                                   318/271
1,768,811 A * 7/1930 West ......................... H02P 1/46
                                                   307/87
(Continued)

FOREIGN PATENT DOCUMENTS

DE        10306329 A    8/2004
DE    102005016259 A    10/2006
(Continued)

*Primary Examiner* — Henry Liu
(74) *Attorney, Agent, or Firm* — Andrew Wilford

(57) ABSTRACT

The invention relates to a method of dosing lubricating grease with a lubricant dispenser (1), comprising a lubricant cartridge (3) filled with lubricating grease (2) and holding a plunger (4) for expelling the lubricating grease (2), a spindle (6) driven by a direct-current drive motor (5) for moving the plunger (4), a power supply (7), a controller (8) for operating the motor (5) with a microcontroller (9), and a device (10) for interrupting the motor current flowing through the motor (5). The motor (5) is started up by the controller (8) in adjustable time intervals and a dose of dispensed agent is expressed from the cartridge (3) through a plunger motion with a predetermined plunger stroke. The motor current and the motor voltage are measured during motor operation, and the motor runtime, and the plunger stroke is calculated with the current and voltage measured values and at least one motor characteristic. The motor current is interrupted when the motor operating time reaches the calculated motor runtime.

7 Claims, 2 Drawing Sheets

(51) Int. Cl.
*F16N 11/08* (2006.01)
*F16N 13/10* (2006.01)
*F16N 13/08* (2006.01)
*F16N 3/12* (2006.01)
*F16N 29/02* (2006.01)
*H02P 7/00* (2016.01)
*H02P 7/29* (2016.01)
*H02P 23/14* (2006.01)
*H02P 23/20* (2016.01)
*H02P 31/00* (2006.01)

(52) U.S. Cl.
CPC .............. *H02P 23/14* (2013.01); *H02P 23/20* (2016.02); *H02P 31/00* (2013.01)

(58) Field of Classification Search
USPC .................................................... 184/37, 38.4
See application file for complete search history.

(56) References Cited

U.S. PATENT DOCUMENTS

| | | | | | |
|---|---|---|---|---|---|
| 2,063,411 | A * | 12/1936 | Tear | ............ | F16N 3/12 222/257 |
| 4,671,386 | A * | 6/1987 | Orlitzky | ............ | F16N 11/10 184/39 |
| 5,022,556 | A * | 6/1991 | Dency | ............ | B05C 11/10 118/410 |
| 5,271,528 | A * | 12/1993 | Chien | ............ | F16N 11/08 184/38.4 |
| 5,332,954 | A * | 7/1994 | Lankin | ............ | B60L 11/1805 318/139 |
| 5,788,012 | A * | 8/1998 | Yang | ............ | F16N 11/10 184/39 |
| 5,971,229 | A * | 10/1999 | May | ............ | F16N 11/08 222/327 |
| 5,992,700 | A * | 11/1999 | McGlothlin | ............ | A61M 5/1486 222/187 |
| 6,215,969 | B1 | 4/2001 | Nomura | | |
| 6,408,985 | B1 * | 6/2002 | Orlitzky | ............ | E06C 7/48 182/107 |
| 6,561,316 | B1 * | 5/2003 | Fenn | ............ | F16C 33/6625 184/105.1 |
| 6,601,738 | B2 * | 8/2003 | Weigand | ............ | F16N 11/08 184/37 |
| 7,228,941 | B2 * | 6/2007 | Weigand | ............ | F16N 11/08 184/7.4 |
| 8,607,933 | B2 * | 12/2013 | Eisenbacher | ............ | F16N 11/10 184/29 |
| 8,783,418 | B2 * | 7/2014 | Orlitzky | ............ | F16N 13/14 184/37 |
| 8,978,828 | B2 * | 3/2015 | Eisenbacher | ............ | F16N 11/10 184/39 |
| 9,435,485 | B2 * | 9/2016 | Morper | ............ | F16N 11/10 |
| 2002/0079336 | A1 * | 6/2002 | Weigand | ............ | F16N 11/08 222/389 |
| 2002/0185926 | A1 * | 12/2002 | King | ............ | H02P 6/182 310/68 B |
| 2004/0129500 | A1 * | 7/2004 | Weigand | ............ | F16N 25/04 184/105.1 |
| 2004/0155068 | A1 * | 8/2004 | Weigand | ............ | F16N 11/08 222/333 |
| 2006/0180395 | A1 * | 8/2006 | Graf | ............ | F16N 11/08 184/26 |
| 2008/0060879 | A1 * | 3/2008 | Orlitzky | ............ | B01J 7/02 184/39 |
| 2008/0106224 | A1 * | 5/2008 | Fu | ............ | B60K 6/26 318/139 |
| 2008/0271950 | A1 * | 11/2008 | Eisenbacher | ............ | F16N 11/10 184/7.4 |
| 2008/0300827 | A1 * | 12/2008 | Lu | ............ | H02P 23/14 702/182 |
| 2009/0133962 | A1 * | 5/2009 | Orlitzky | ............ | F16N 13/14 184/37 |
| 2009/0284211 | A1 * | 11/2009 | Gao | ............ | G01R 31/343 318/727 |
| 2010/0244754 | A1 * | 9/2010 | Marumoto | ............ | H02P 23/03 318/400.11 |
| 2011/0213589 | A1 * | 9/2011 | Lu | ............ | H02P 23/14 702/182 |
| 2011/0296902 | A1 * | 12/2011 | Eisenbacher | ............ | F16N 11/10 73/53.05 |
| 2011/0315485 | A1 * | 12/2011 | Morper | ............ | F16N 11/10 184/39 |
| 2012/0098477 | A1 * | 4/2012 | Gao | ............ | H02P 23/14 318/798 |
| 2012/0217917 | A1 * | 8/2012 | Kunzel | ............ | H02P 6/10 318/400.11 |
| 2013/0209074 | A1 * | 8/2013 | Lebrun | ............ | H02P 6/06 388/809 |
| 2015/0041488 | A1 * | 2/2015 | Morper | ............ | F16N 11/10 184/39 |

FOREIGN PATENT DOCUMENTS

DE 102008004382 A 7/2009
WO 2004072130 A 8/2004

* cited by examiner

METHOD OF DOSING LUBRICANT GREASE WITH A LUBRICANT DISPENSER

CROSS REFERENCE TO RELATED APPLICATIONS

This application is the US-national stage of PCT application PCT/EP2013/072523 filed 28 Oct. 2013 and claiming the priority of German patent application 102012111376.9 itself filed 23 Nov. 2012.

FIELD OF THE INVENTION

The invention relates to a method of dosing lubricating grease with a lubricant dispenser comprising a lubricant cartridge filled with the lubricating grease and holding a plunger for expelling the lubricating grease, a spindle driven by a direct-current drive motor for moving the plunger, a power supply and a controller for operating the motor with a microcontroller and a device for interrupting the motor current flowing through the motor.

To enable precise metering, it is necessary to have precise knowledge of the stroke of the plunger. Deviations from the predetermined dispensed amount can result in inefficient lubricant consumption on the one hand or insufficient lubrication, and, as a result, bearing damage. It is for this reason that elaborate sensors are currently used in lubricant dispensers of the generic type that record the stroke of the plunger or the number of rotations completed by the spindle. Such sensors make a compact construction of the lubricant dispensers impossible, generate additional costs and are occasionally susceptible to external disturbances.

DE 103 06 329 discloses a method of controlling a direct-current motor with a servo drive. The cumulative angle of rotation of the direct-current motor is calculated from its operating values, and the motor is slowed down by short-circuiting at a calculated angle. The motor control is intended for a highly dynamic servo system in which the brake path makes up a substantial portion of the total stroke, particularly for a steering lock, a door, a cover or a flap in automobiles.

OBJECT OF THE INVENTION

Against this background, it is the object of the invention to provide a method of dosing lubricating grease with a lubricant dispenser in a manner that is as simple and cost-efficient in its implementation as possible.

SUMMARY OF THE INVENTION

The lubricant dispenser comprises a lubricant cartridge filled with lubricating grease, a plunger for expelling the lubricating grease, a spindle driven by a direct-current drive motor for moving the plunger, a power supply and a controller for operating the motor with a microcontroller, and a device for interrupting the motor current flowing through the motor. The motor is operated by the controller in adjustable time intervals such that a dose of dispensed agent expelled from the cartridge by a plunger movement with a predetermined plunger stroke. According to the invention, the motor current and the motor voltage are monitored during motor operation, and the motor runtime needed to generate the predetermined plunger stroke is calculated from the measured current and voltage and at least one motor characteristic. When the motor operating time reaches the calculated motor runtime, the motor current is interrupted. Here, motor current and motor voltage refer to the voltage applied to the motor and the electric current flowing through the motor. Worthy of consideration as motor characteristics are, particularly, the armature resistance and a general motor constant to be determined empirically and that encompasses the magnetic field intensity of a permanent magnet built into the electric motor, geometric influencing variables of the coil arrangement, bearing resistances and the like.

According to one preferred embodiment of the method according to the invention, the ambient temperature is measured, and a temperature-dependent motor characteristic is calculated with a temperature function stored in the controller. The controller expediently has a temperature sensor for this purpose. This can also be integrated directly into the microcontroller. The temperature function can be provided as an arithmetic statement, for example. Furthermore, a value table can be stored in a memory of the microcontroller from which individual values of the table or values interpolated therebetween are outputted as a function of the input value.

The device for interrupting the motor current can be formed, for example, by a bipolar transistor, a field-effect transistor, preferably a metal-oxide semiconductor field-effect transistor, or even by a relay. Transistors can be installed in a highly space-saving manner and even integrated into a microcontroller.

In another preferred embodiment of the method according to the invention, the voltage dropping across the motor is set to a target value by pulse-width modulation in an operating phase while the motor is running. The pulse-width modulation constitutes a conventional method of supplying an electrical consumer with only a portion of the voltage supplied by a power supply without loss of electrical energy. If the voltage is set via a control loop to a target value, the output voltage is largely independent of the supply voltage. This is particularly attractive in applications that are fed by batteries, since their voltage diminishes over the course of their service lives.

Preferably, the actual motor voltage is measured in short time intervals. Intervals on the order of 10 ms are useful for the present application in order to achieve effective control. To ensure a reliable and fast start-up of the electric motor, it is further advantageous to apply a voltage to the motor during a startup phase prior to the operating phase higher than the target voltage of the operating phase. This is intended to keep the cycle in which the motor is not yet running at the target speed as short as possible. Moreover, this also prevents the motor from coming into operation slowly or not at all due to reduced power and mechanical obstacles to startup.

In one preferred embodiment of the method according to the invention, the target voltage is selected during the operating phase as a function of the type of lubricant cartridge. Usually, lubricant cartridges with different-sized lubricant reservoirs exist for different applications. The different cartridge sizes each also include different dispenser boxes. Since dispensing occurs more quickly with a higher supply voltage—and thus at a higher motor speed—but the dispensing accuracy is reduced, it is advantageous to provide different operating voltages for the individual cartridge types, representing a best-possible compromise between dispensing speed and dispensing accuracy.

Advantageously, the motor is not short-circuited for braking at the end of the operating phase. Such shorting is not necessary since, as a result of the great mechanical resistance provided by the spindle, plunger and lubricating grease, the electric motor comes to a standstill practically immediately or at least after a short delay once the supply voltage is cut. Overloading of the electronics as a result of short-circuit currents can also be prevented.

BRIEF DESCRIPTION OF THE DRAWING

The invention will be explained below with reference to an illustrated embodiment shown schematically in the drawing.

SPECIFIC DESCRIPTION OF THE INVENTION

Figure 1:
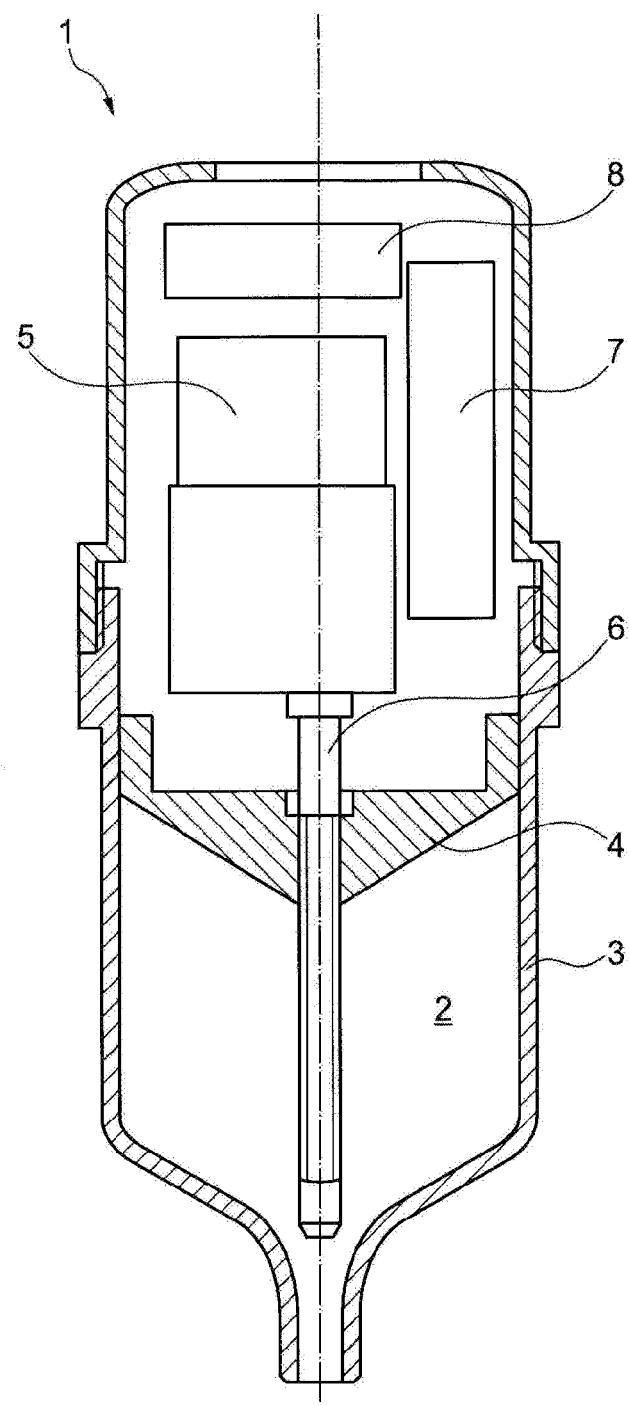
FIG. 1 is a longitudinal section through a lubricant dispenser for carrying out the method according to the invention.

FIG. 1 is a longitudinal section through a lubricant dispenser 1 having a lubricant cartridge 3 filled with a body 2 of lubricating grease. The lubricant cartridge 3 holds a plunger 4 for expelling the lubricating grease 2, a spindle 6 driven by a direct-current motor 5 for moving the plunger 4, a power supply 7 and a controller 8 for operating the motor 5.

Figure 2:
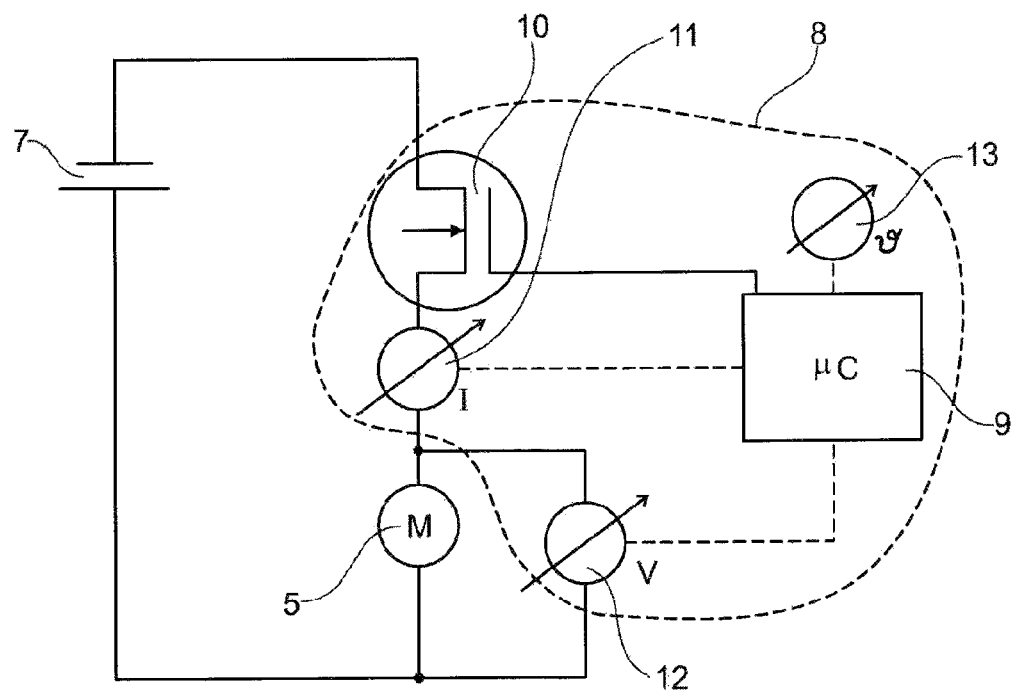
FIG. 2 is a simplified circuit diagram of the motor control.

It can be seen from the circuit diagram in FIG. 2 that the controller 8 has a microcontroller 9, a device 10 for interrupting the motor current flowing through the motor, a current sensor 11 for measuring the actual motor current, and a voltage meter 12 for measuring the voltage drop across the motor. Moreover, the circuit diagram shows the motor 5 and the power supply 7. The motor 5 is operated in adjustable time intervals by the controller 8. For that purpose, the microcontroller 9 connects the power supply to the device 10 by a corresponding control signal. The spindle 6 is rotated and the plunger 4 is set in motion by the motor 5. A defined stroke of the plunger 4 expels a defined quantity of the lubricating grease 2 out of the cartridge 3. During motor operation, the motor current and the motor voltage are detected by the sensors 11 and 12 and processed by the microcontroller 9. The microcontroller 9 calculates the required motor runtime from the measured values and at least one motor characteristic in order to produce the desired plunger stroke. The motor characteristics that are considered are the armature resistance as well as an empirically determinable motor constant that includes geometric influencing variables of the coil arrangement, bearing resistances and the like. Once the calculated motor runtime is reached, the microcontroller 9 cuts the motor current by the switch 10.

In the illustrated example, the controller 8 further comprises a temperature sensor 13 with which the microcontroller 9 determines the ambient temperature. Using a temperature function stored in the memory of the microcontroller 9, at least one motor characteristic can be determined from this as a function of temperature.

Moreover, the device 10 for interrupting the motor current can be formed in the illustrated embodiment by a metal-oxide semiconductor field-effect transistor.

In this illustrated embodiment, the microcontroller 9 controls the motor 5 via the device 10 by pulse-width modulation. The device 10 is continuously rendered conductive over and over again in quick succession, and the power circuit is kept closed for a short period of time and then switched off again by the device 10. As long as the power circuit is closed, the entire voltage is applied. When the power circuit is open, no voltage at all is applied via the consumer. The effective average output of the power circuit can be set by selecting the ratio between the times in which the switch is switched on or off. If the frequency at which the switch-on and switch-off operations occur is selected so as to be sufficiently large, this type of power supply acts on an electrically inactive consumer, such as an electric motor, for example, as if it were supplied at a constant voltage whose level is reduced in comparison to the supply voltage of the primary power source 7 by the ratio of time switched on to the total time.

Figure 3:
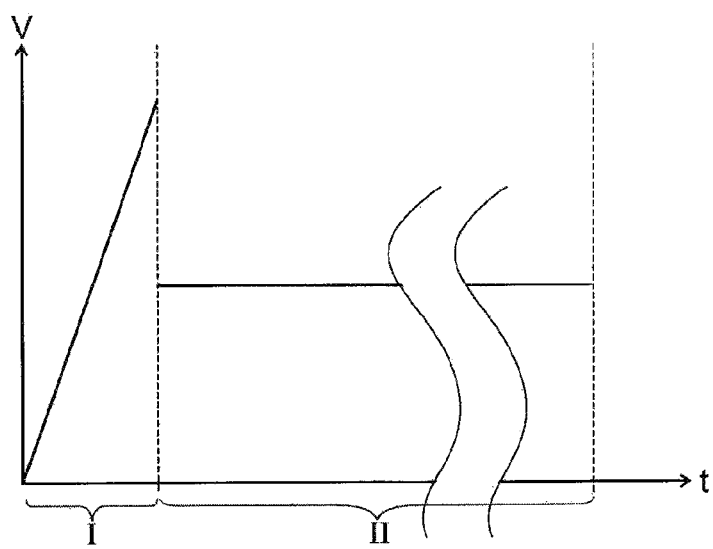
FIG. 3 shows the time profile of the microcontroller-controlled motor voltage during a dispensing operation.

FIG. 3 shows the time profile of the target voltage during a dispensing operation by way of example. During a startup phase I, the target voltage is continuously increased. The value can be increased up to the technically possible maximum. Due to the short duration of the startup phase I—usually about 50 ms—damage to the motor 5 as a result of excessively large currents or voltages is ruled out. The high maximum voltage ensures that the motor 5 is reliably started up in the startup phase I provided for that purpose. The startup phase I is followed by the operating phase II. During this phase, the pulse-width modulation is regulated such that a constant target voltage is produced. A check is performed of the actual motor voltage every 10 ms during the operating phase II by the voltage meter 12. The purpose of the regulation is to keep the motor voltage constant even when the electrical resistance of the motor 5 changes as a result of heat, for example. The operating phase II ends when the motor runtime calculated by the microcontroller 9 has been reached. The motor current is then interrupted.

The invention claimed is:

1. A method of operating a lubricant dispenser comprising:
   a lubricant cartridge filled with lubricating grease,
   a plunger movable in the cartridge for expelling the lubricating grease,
   a spindle connected to the plunger,
   a direct-current drive motor for driving the spindle and thereby moving the plunger,
   a power supply,
   a controller connected between the power supply and the motor for operating the motor, and
   a device for interrupting the motor current flowing through the motor,
   the method comprising the steps of:
   starting the motor by the controller in adjustable time intervals to expel a dose of the lubricant from the cartridge through a plunger motion with a predetermined plunger stroke,
   monitoring the motor current and the motor voltage and setting the motor voltage by the controller to a target value during an operating phase of the motor,
   calculating the motor runtime needed to generate the predetermined plunger stroke from the measured current and voltage and at least one motor characteristic, and
   interrupting by the device the motor current and thereby open circuiting the motor when the motor operating time reaches the calculated motor runtime.

2. The method defined in claim 1, further comprising the step of:
   measuring the ambient temperature and calculating at least one temperature-dependent motor characteristic with a temperature function stored in the controller.

3. The method defined in claim 1, wherein a field-effect transistor is used as the device for interrupting the motor current flowing through the motor.

4. The method defined in any claim 1, wherein the motor voltage is set by pulse-width modulation in the operating phase while the motor is running.

5. The method defined in claim 4, further comprising the step of:
   measuring the actual motor voltage in short time intervals.

6. The method defined in claim 1, further comprising the step, during a startup phase prior to the operating phase, of:
   applying a voltage to the motor that is higher than the target voltage of the operating phase.

7. The method defined in claim 1, further comprising the step of:
   selecting the target voltage during the operating phase as a function of the type of lubricant cartridge.

* * * * *